April 26, 1960 — A. PETRIW — 2,934,644

SEMI-COINCIDENCE DETECTOR

Filed Jan. 6, 1959

INVENTOR,
ANDREW PETRIW.
BY Harry M. Saragovitz
ATTORNEY

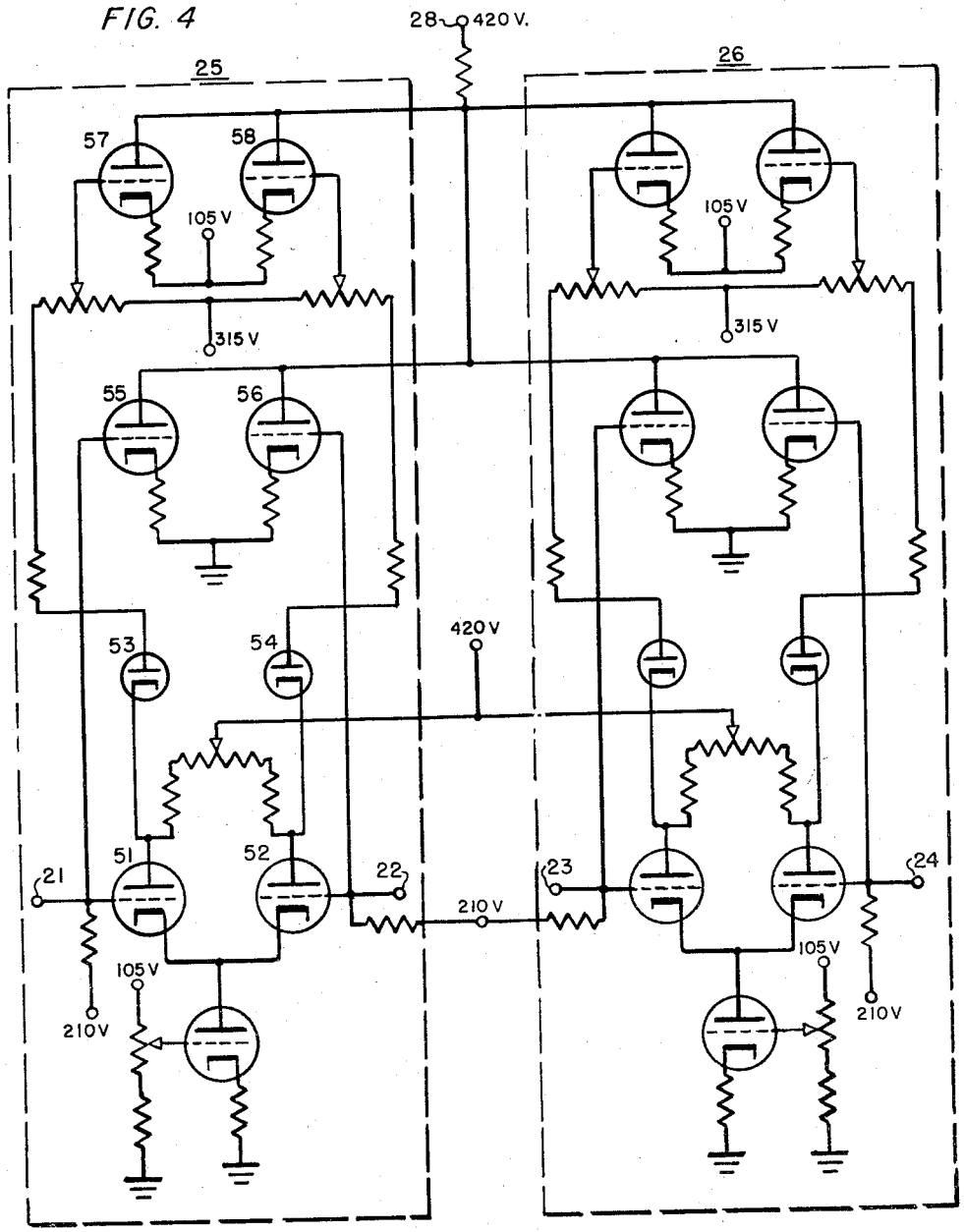

United States Patent Office 2,934,644
Patented Apr. 26, 1960

2,934,644

SEMI-COINCIDENCE DETECTOR

Andrew Petriw, Spring Lake Heights, N.J., assignor to the United States of America as represented by the Secretary of the Army Application January 6, 1959, Serial No. 785,299

6 Claims. (Cl. 250—27)

(Granted under Title 35, U.S. Code (1952), sec. 266)

The invention described herein may be manufactured and used by or for the Government for governmental purposes, without the payment of any royalty thereon.

This invention relates to detectors and particularly to systems for detecting signals in the presence of noise, more particularly this invention relates to a device for detecting signals and increasing the signal to noise ratio in a system having three or more synchronous signal inputs. More particularly this invention relates to systems for utilizing a noise cancelling coincidence detector with two inputs in a system having three or more channels.

There are several approaches to the problem of the reduction of noise in signal transmission systems, including the popular noise limiting and squelch circuits, but these are only effective where the signal has a reasonable strength in comparison with the noise level. A more effective way of improving the reception is to use two or more receivers in the concept employed in space diversity systems, where the simultaneous coincidence of signals in all of the channels provides a reinforcement of the signals and an attenuation of the noise level. In these systems the two or more separate channels are algebraically added or multiplied so that the noise impulses which are random are statistically attenuated while the transmitted signals which are coincident are algebraically increased.

The effectiveness of coincidence detection of signals where two channels are present is greatly improved by the use of the coincidence detector described in my co-pending patent application Serial Number 785,298, for a Coincidence Detector, Docket No. 9300 filed concurrently herewith. In this circuit the output of a pair of channels is compared and the comparative signal is subtracted so that the incidence of an impulse on one channel and not on the other results in a cancellation of that impulse. The output of the pair of channels is also added in the usual way to detect the coincidence of signals on both channels.

This coincident detector system is very effective but it can be applied only to pairs of channels. Furthermore, it discriminates against the signals as well as the noise impulses unless the signals are simultaneous and substantially equal in both channels. If either signal is absent the output is zero.

It is therefore an object of this invention to provide an improved system for detecting signals in the presence of noise. It is a further object of this invention to provide an improved system for receiving the signals from three or more channels and utilizing a two channel coincidence detector for detecting coincident signals in the presence of a high noise level.

This and other objects are accomplished by combining pairs of coincidence detectors in two or more of the combinations possible in a system of three or more channels and algebraically adding the outputs of all the coincidence detectors so that a signal can be detected with a minimum of noise even though it is not coincident on all of the channels simultaneously, as long as it is coincident on at least two of the channels.

This system may be more fully understood and other and further objects of this invention will become more apparent from the following specification and the drawings of which:

Fig. 4 shows the complete circuit of the rudimentary four channel semi-coincidence detectors of Fig. 2.

The coincidence detector mentioned earlier comprises a dual input system with a differential detecting circuit in addition to an algebraic adding circuit of the conventional type. The difference between the input signals is detected, inverted, and applied to the algebraic adding circuit to cancel the impulse which caused the differential. In this coincidence detector if two signals are received simultaneously they will be added in the normal way. However if impulses appear on only one of the two channels the difference detector will react to produce equal and opposite impulses which, when applied to the conventional algebraic adding circuit along with the original impulses, will cancel the original impulses. These coincidence detectors are used in all of the systems described in this application.

Figure 1:
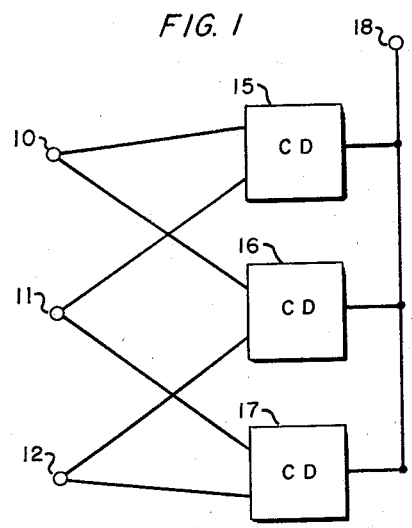
Fig. 1 shows a three channel semi-coincidence detector.

Referring now more particularly to Fig. 1 a three channel system is shown with the channels 10, 11 and 12. In this system three coincidence detectors 15, 16 and 17 are needed. Their outputs are combined algebraically in the junction 18. Each of the channels is applied to at least two separate coincidence detectors so that the signals and noise impulses in each channel are compared in a coincidence detector with those of each of the other two channels so that if any two of the channels have coincident signals the corresponding coincidence detector will have an output signal.

If signals are coincident on all three of the channels, as they should normally be, all three of the coincidence detectors will be actuated and their outputs added algebraically to provide the maximum signal that could be normally obtained. On the other hand if only two of the channels have coincident signals only the coincidence detector common to that pair will have an output. The other two coincidence detectors will have zero output since the channel with no signal will cause cancellation of the impulses from the two active channels in each of those coincidence detectors. If only one of the channels carries a signal it will find no coincident signal or synchronous impulse in either of the other channels and it will be cancelled in the same way that noise would be cancelled in the two coincidence detectors that it reaches.

Figure 2:
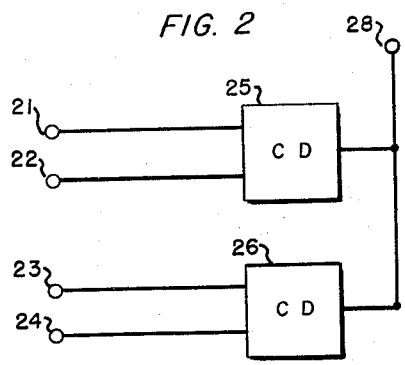
Figs. 2 and 3 show four channel semi-coincidence detectors.

Referring now to Fig. 2, a rudimentary, four channel system is shown where the channels are divided into pairs and applied to coincidence detectors. The outputs of the two coincidence detectors are combined algebraically.

In this circuit, if only one impulse is received it will not actuate either of the coincidence detectors. If two signals are coincident on two of the channels they may actuate one of the coincidence detectors if they are both applied to that coincidence detector. If the two signals are applied to different coincidence detectors they will, of course, be cancelled. If signals are coincident on three of the channels at least one of the coincidence detectors will be actuated and if all four channels have coincidence signals, both coincidences detectors will be actuated and the signals will be added algebraically to provide a maximum output.

Figure 3:
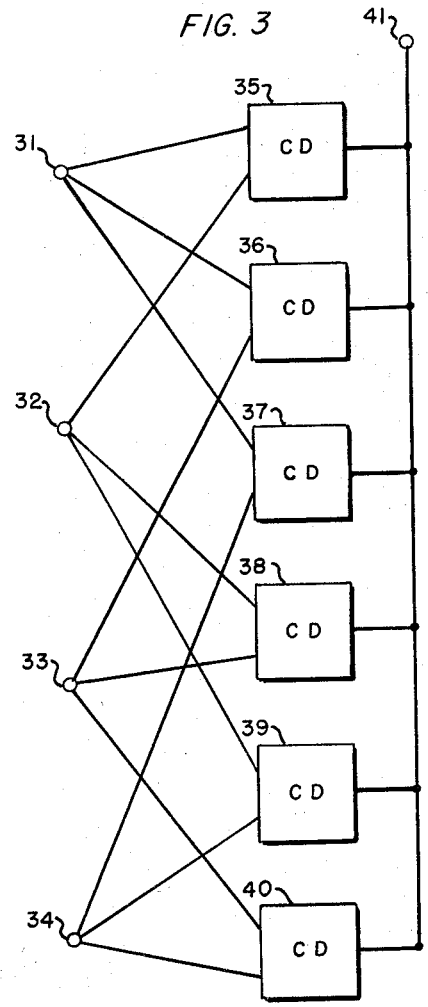

Fig. 3 shows an improved four channel system where every possible combination of pairs that can be formed by the four channels has a corresponding coincidence detector. This system will respond to any two coincident signals on any two of the channels since every possible pair of channels has its corresponding coincidence detector. Signals on three of the channels would normally actuate three of the coincidence detectors to provide a substantial signal at the combined output. When four signals are applied, all of the coincidence detectors will be actuated and the full output of all the coincidence detectors will be added algebraically.

Fig. 4 shows the circuit of the rudimentary four channel system of Fig. 2. It is included particularly to show a typical example of the basic coincidence detector circuit. In Fig. 4 the two coincidence detectors 25 and 26 correspond to 25 and 26 of Fig. 2. The input channels 21 thru 24 and the output 28 also have their counterparts in Fig. 2.

The inputs 21 and 22 are applied to the differential detector and amplifier tubes 51 and 52 which invert and amplify any noise or other pulses that appear on one of the channels and not on the other. Such noncoincident pulses actually cause impulses to appear on the plates of both of the tubes 51 and 52 in a manner well known in the art but these impulses are applied to the diodes 53 and 54 which transmit only the negative of the two impulses to the algebraic addition circuits to cancel only the positive pulses regardless of which channel may have carried them. Suitable amplifying and voltage dividing components are provided to regulate the level of the negative impulses applied to the algebraic adding circuit to exactly compensate for the positive pulses appearing on the one channel. For example, a positive pulse appearing on channel 21 and not on channel 22 will produce a negative impulse of equal and opposite magnitude at the diode 53. This latter is applied to one of the tubes 57 of the algebraic adding circuit to directly cancel the positive pulse on channel 21 applied directly to the tube 55 of the same algebraic adding circuit. The same process would occur thru the tubes 52, 54, 56 and 58 if the positive pulse were applied to the channel 22 rather than 21. If positive pulses are coincident on both channels the differential circuit of tubes 51 and 52 is not actuated and the coincidence is detected by the algebraic addition of the two pulses in the tubes 57 and 58 to provide an output pulse across the plate load of this circuit at 28.

The coincidence detector circuit in the block 26 is the same as that in the block 25 and operates in the same way. If the signals are coincident on all four of the input channels none of the signals will be cancelled in either of the coincidence detectors 25 or 26 and the full output will be applied at 28. Noise and other random and other random impulses will be, for the most part, cancelled.

This system is set up for use with positive pulses which are normally available directly from the detector of a receiver or which can be produced by well known diode action on alternating signals. If negative pulses are to be detected, the circuit can be adapted for this by reversing the polarity of the diodes 55 and 56.

This invention is particularly applicable where several direct transmission channels are available but where the signal is so weak and the noise is so great, comparatively, that the individual signals on any one channel are practically unreadable. The semi-coincidence detector circuit will detect the presence of a signal and clarify it considerably through its high percentage of noise cancellation.

This system reduces the noise level to the point where the signals can be further amplified by conventional means to any desired level in a manner well known in the art.

Although only three and four channel systems have been shown it is obvious that five, and even more, channel systems can be adapted to the use of coincidence detectors by choosing pairs of the channels in some or all of the possible combinations and applying them to the available coincidence detectors.

Although vacuum tubes are shown in the circuit of Fig. 4 it is obvious that the circuit can be redesigned for the use of transistors by suitable changes well known in the art.

What is claimed is:

1. In a system for detecting the presence of signals in at least one pair of channels in a multichannel communications system having a high noise level, a plurality of coincidence detecting circuits having means for cancelling non-coincident impulses and means for algebraically adding coincident signals in a pair of channels, each of said coincidence detecting circuits connected to a separate pair of channels of said communications system, and means for algebraically combining the outputs of said coincidence detecting circuits.

2. A system for detecting signals and reducing noise in a multichannel communications system comprising a plurality of coincidence detecting circuits having means for algebraically adding coincident signals and means for cancelling non-coincident impulses in a pair of communication channels, a separate pair of communication channels connected across each of said coincidence detecting circuits, and an algebraic adding circuit having a plurality of inputs each connected to one of said coincidence detecting circuits and a common output.

3. In a system for detecting signals in the presence of noise in a multichannel communications system, and channels capable of being divided into separate pairs, a coincidence detector connected to each of said pairs, each of said coincidence detectors having means for adding coincident signals and cancelling non-coincident, random noise impulses, an algebraic adding circuit having inputs connected to each of said coincidence detecting circuits and a common output.

4. In a system for detecting the coincidence of signals in at least two channels of a multichannel communications system, at least two coincidence detectors having means for adding coincident signals and means for cancelling non-coincident impulses, said coincidence detectors each connected across a pair of said communications channel, an algebraic adding circuit having at least two inputs and a common output, one of said inputs connected to each of said coincidence detectors.

5. In combination with a communications system having a first, a second, and a third channel carrying the same coincident signals in the presence of considerable random noise; a first, a second and a third coincidence detector each having two channel inputs and a single output for adding signals coincident on said two channel inputs and cancelling non-coincident signals appearing on either of said two channels, said inputs of said first coincidence detector connected to said first and said second channels, said inputs of said second coincidence detector connected to said first and said third channels, said inputs of said third coincidence detector connected to said second and said third channels; and an algebraic adding circuit having a single output and three inputs, one of said inputs connected to the output of each of said coincidence detectors.

6. In combination with a communications system having a first, a second, a third and a fourth channel carrying the same coincident signals in the presence of considerable random noise; a first, a second, a third, a fourth, a fifth, and a sixth coincidence detector each having two inputs and a single output; said inputs of said first coincidence detector connected to said first and said second channels; said inputs of said second coincidence detector connected to said first and said third channels; said inputs of said third coincidence detector connected to said first and said fourth channels; said inputs of said fourth coincidence detector connected to said second and said third channels; said inputs of said fifth coincidence detector connected to said second and said fourth channels; and said inputs of said sixth coincidence detector connected to said third and said fourth channels; and an algebraic adding circuit having a single output and six inputs, one of said inputs connected to the output of each of said coincidence detectors.

References Cited in the file of this patent

FOREIGN PATENTS 198,428    Great Britain _____ June 1, 1923